(12) United States Patent
Farah et al.

(10) Patent No.: US 7,367,567 B2
(45) Date of Patent: May 6, 2008

(54) LOW LEAKAGE FINGER SEAL

(75) Inventors: Jorge Farah, Glastonbury, CT (US);
Laura Newell, Newington, CT (US);
Debora Kehret, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 116 days.

(21) Appl. No.: 11/070,453

(22) Filed: Mar. 2, 2005

(65) Prior Publication Data
US 2006/0197287 A1    Sep. 7, 2006

(51) Int. Cl.
*F01D 11/00* (2006.01)
(52) U.S. Cl. ...................................... 277/650; 277/652
(58) Field of Classification Search ................ 277/650, 277/652
See application file for complete search history.

(56) References Cited

U.S. PATENT DOCUMENTS

| | | | |
|---|---|---|---|
| 2,924,471 A * | 2/1960 | Poltorak et al. ............ 428/591 |
| 3,113,526 A * | 12/1963 | Paschke ..................... 418/61.2 |
| 4,138,032 A * | 2/1979 | McCabe ..................... 220/224 |
| 4,626,002 A * | 12/1986 | Hagemeister et al. ......... 285/95 |
| 4,645,217 A | 2/1987 | Honeycutt, Jr. et al. |
| 5,657,998 A | 8/1997 | Dinc et al. |
| 5,934,687 A | 8/1999 | Bagepalli et al. |
| 6,315,519 B1 * | 11/2001 | Bagepalli et al. ............ 415/135 |
| 6,325,546 B1 * | 12/2001 | Storace ....................... 384/536 |
| 6,637,751 B2 * | 10/2003 | Aksit et al. .................. 277/416 |
| 6,637,752 B2 * | 10/2003 | Aksit et al. .................. 277/416 |
| 6,655,913 B2 | 12/2003 | Vedantam et al. |
| 6,883,806 B2 * | 4/2005 | Guzzardo .................... 277/628 |

* cited by examiner

*Primary Examiner*—Patricia Engle
*Assistant Examiner*—Gilbert Lee
(74) *Attorney, Agent, or Firm*—Carlson, Gaskey & Olds

(57) ABSTRACT

A seal for an exhaust duct includes a metal mesh member sandwiched between an outer plate and an inner plate. The seal includes a plurality of flexible members defined by a plurality of slots in both the inner and outer plates. The flexible members provide for expansion and contraction along with creating flexibility in the region of contact between the seal land and the seal. The metal mesh member substantially eliminates gaps and leak paths created through the slots. The metal mesh member is composed of a plurality of interwoven wire strands impregnated with a high temperature elastomeric sealant. The impregnation of high temperature elastomeric sealant over the metal mesh member improves sealing while maintaining the desired flexibility of the seal.

14 Claims, 3 Drawing Sheets

LOW LEAKAGE FINGER SEAL

The U.S. Government may have certain rights in this invention in accordance with Contract Number N00019-02-C-3003 awarded by the United States Navy.

BACKGROUND OF THE INVENTION

This invention generally relates to a seal between a fixed member and a movable member. More particularly, this invention relates to a finger seal for an exhaust duct assembly.

A gas turbine engine typically includes an exhaust duct for directing exhaust gases. Many exhaust duct assemblies include a movable portion for selectively directing the exhaust gases. Such exhaust duct assemblies includes a fixed portion and a movable portion. A seal is required between the fixed and movable portions to prevent intrusion of exhaust gases through the exhaust nozzle assembly at the interface between the fixed and movable portions.

The seal is typically provided with a plurality of fingers that are formed by a corresponding plurality of slots. The slots and finger configuration provide for flexing and expansion of the movable member relative to the fixed portion. Disadvantageously, the slots create leak paths through which exhaust gases can intrude. Known seals utilize staggered slot configurations to prevent leakage. Such staggered slots are of limited success as leak paths may still form. A known seal includes a cloth between inner and outer sheets that covers the slots. The cloth is fabricated from a temperature resistant material such as Nextel hi-temp ceramic fabric. Disadvantageously, cloth degrades and frays over time. Further the use of cloth complicates manufacture and assembly.

Accordingly it is desirable to design and develop an improved seal for an exhaust nozzle for sealing between a fixed portion and a movable portion that improves manufacturability and durability.

SUMMARY OF THE INVENTION

This invention is an exhaust duct assembly seal that includes a metal mesh member disposed between slotted inner and outer plates for substantially reducing leakage through gaps created by the slotted inner and outer plates.

The seal includes a metal mesh member sandwiched between an outer plate and an inner plate. The seal is biased against a seal land. The seal includes a plurality of flexible members defined by a plurality of slots in both the inner and outer plates. The flexible members provide for expansion and contraction along with creating flexibility in the region of contact between the seal land and the seal. The metal mesh member substantially eliminates gaps and leak paths created through the slots.

The metal mesh member is composed of a plurality of interwoven wire strands. The mesh member is impregnated with a high temperature elastomeric sealant. The impregnation of high temperature elastomeric sealant over the metal mesh member improves sealing while maintaining the desired flexibility of the seal.

The seal of this invention includes a metal mesh member impregnated with a high temperature elastomeric sealant providing an improved seal while maintaining the desired flexibility between a fixed portion and a movable portion of an exhaust duct assembly.

These and other features of the present invention can be best understood from the following specification and drawings, the following of which is a brief description.

DETAILED DESCRIPTION OF THE PREFERRED EMBODIMENT

Figure 1:
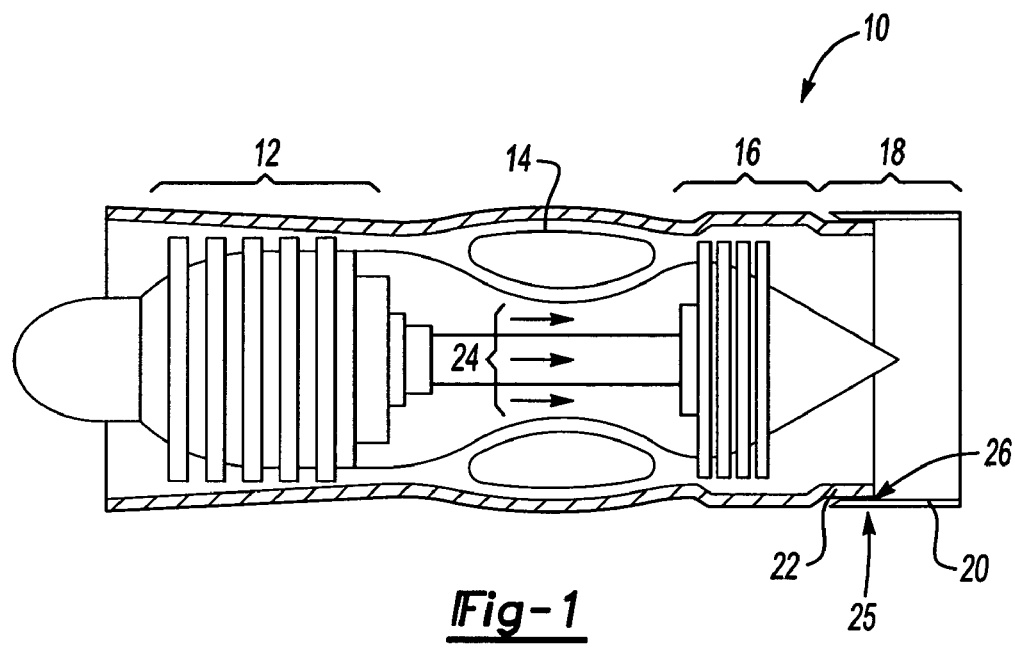
FIG. 1 is a schematic view of a turbine engine including an exhaust nozzle assembly with an example seal assembly according to this invention.

Referring to FIG. 1, a gas turbine engine assembly 10 includes a compressor 12 for compressing incoming air. Compressed air is mixed with fuel in a combustor 14 and ignited to generate an axial flow of hot exhaust gases 24. The hot exhaust gases drive a turbine 16 that in turn drives the compressor 12. An exhaust duct assembly 18 directs the out going exhaust gases 24. The exhaust duct assembly 18 includes a fixed part 22 and a movable part 20 for selectively directing exhaust gases 24. The interface 25 between the fixed part 22 and movable part 20 includes a seal 26 for substantially preventing leakage of exhaust gases radially from the exhaust duct assembly 18.

Figure 2:
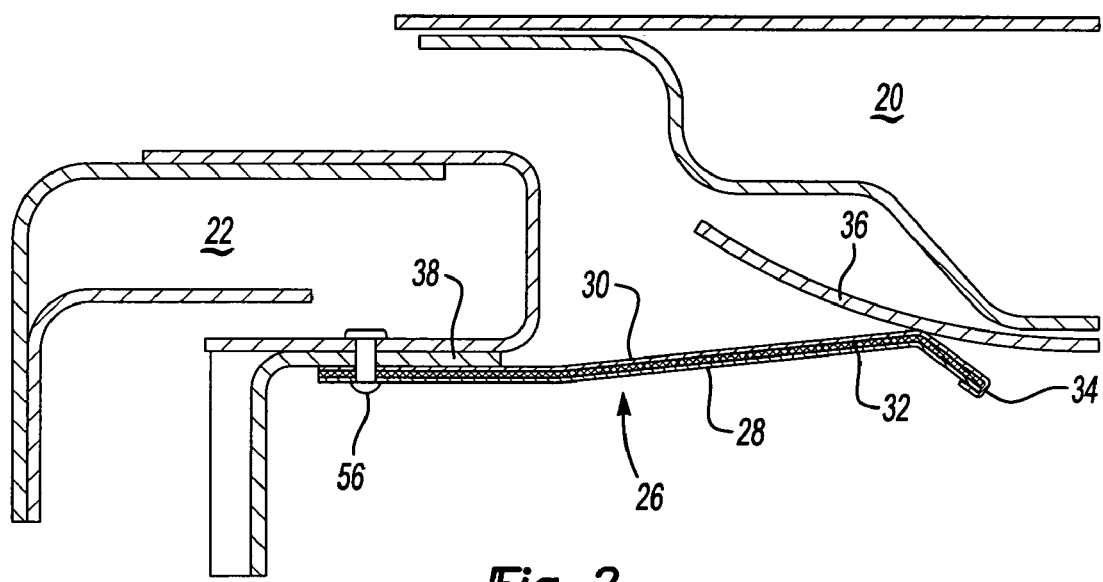
FIG. 2 is a cross-sectional view of the example seal assembly.

Referring to FIG. 2, the seal 26 is biased into sealing contact with a seal land 36. The seal 26 includes an outer plate 28 that is exposed to the gas stream 24 and an inner plate 30 that is in contact with the seal land 36. A metal mesh member 32 is sandwiched between the outer plate 28 and the inner plate 30. The seal 26 is fixed to the fixed part 22 and extends axially outward into contact with the seal land 36. A seal mount surface 38 provides for attachment of the seal 26 to the fixed part 22. The Seal 26 is attached by a series of rivets 56. The rivets 56 extend through each of the inner and outer plates 28, 30. The rivets 56 also extend through the metal mesh member 32. The seal 26 is biased radially outward such that a pressure is exerted by the seal 26 against the seal land 36. The pressure is such that a desired seal is provided without causing an undue amount of frictional contact.

The seal 26 includes a plurality of flexible members 34 that are disposed at an end portion of the seal 26. The flexible members 34 provide for expansion and contraction along with creating flexibility in the region of contact between the seal land 36 and the seal 26. As appreciated, although the seal 26 is shown mounted to the fixed part 22, it may also be fixed to the movable part 20 and contact a seal land on the fixed part 22.

Figure 3:
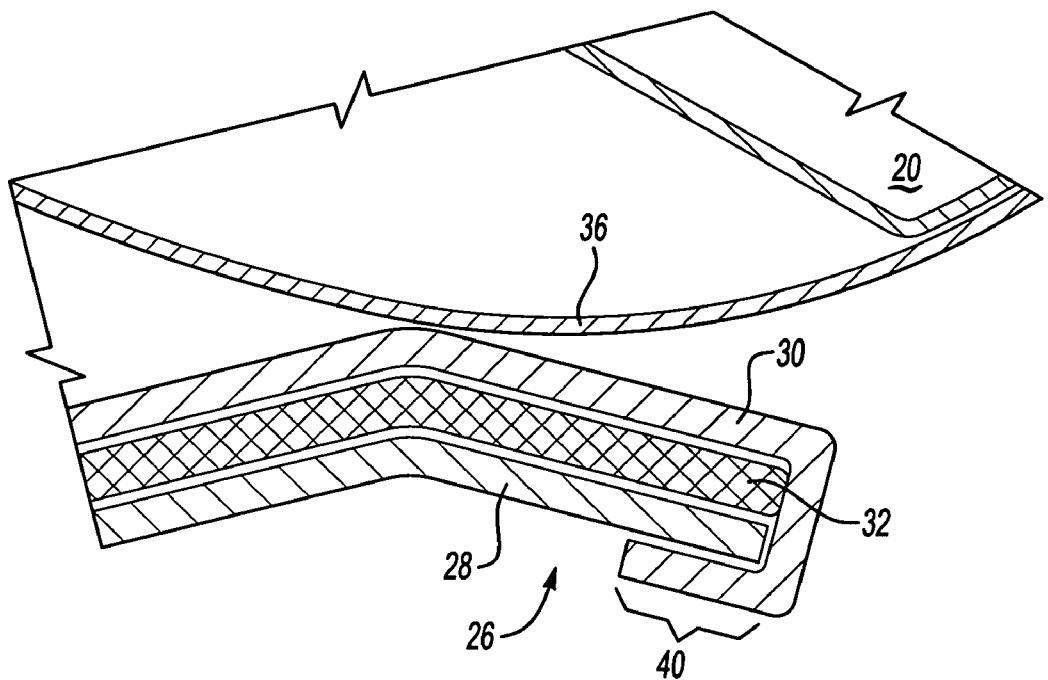
FIG. 3 is an enlarged cross-section of the example seal assembly.

Referring to FIG. 3, an enlarged view of the end of the seal 26 is shown. The seal 26 includes an inner metal mesh member 32 that is sandwiched between the inner plate 30 and the outer plate 28. The inner plate 30 includes an overlapped portion 40 that secures the inner plate 30 and outer plate 28 together. Further the overlapped portion 40 provides a simple effective means of securing the metal mesh member between the inner plate 30 and the outer plate 28.

Figure 4:
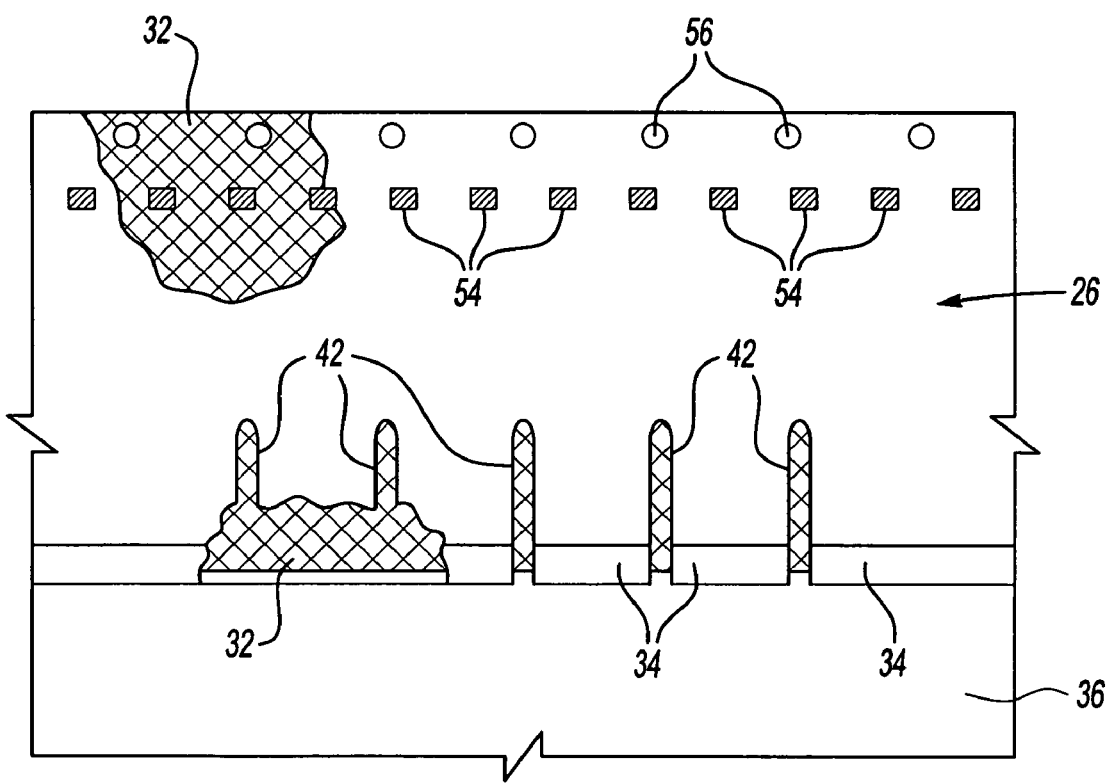
FIG. 4 is a top view of the example seal assembly.

Referring to FIG. 4, the seal 26 includes a plurality of slots 42 that are spaced a distance apart to define a corresponding plurality of flexible members 34 or fingers. The flexible members 34 create a desired flexibility in the seal 26 desired to accommodate movement of the movable part 20 relative to the fixed part 22. The metal mesh member 32 prevents the creation of gaps between slots that could allow leakage of combustion gases. The metal mesh member 32 substantially eliminates gaps and leak paths created by the slots 42. The metal mesh member 32 remains flexible while substantially blocking the flow of combustion gases through the slots 42.

The metal mesh member 32 is attached to one of the inner and outer plates 28, 30 by a series of welds 54. The use of a metal mesh member 32 provides for attachment by way of the weld 54s. The weld 54 may be between either of the inner and outer plates 28, 30 or both. Further, the weld 54 may be provided by any means known to a worker skilled in the art including, plasma, arc and laser welding. Additionally, although the weld 54 is shown as a series of spot welds disposed longitudinally along the seal 26, the weld 54 may also be a single continuous weld or other configuration.

Figure 5:
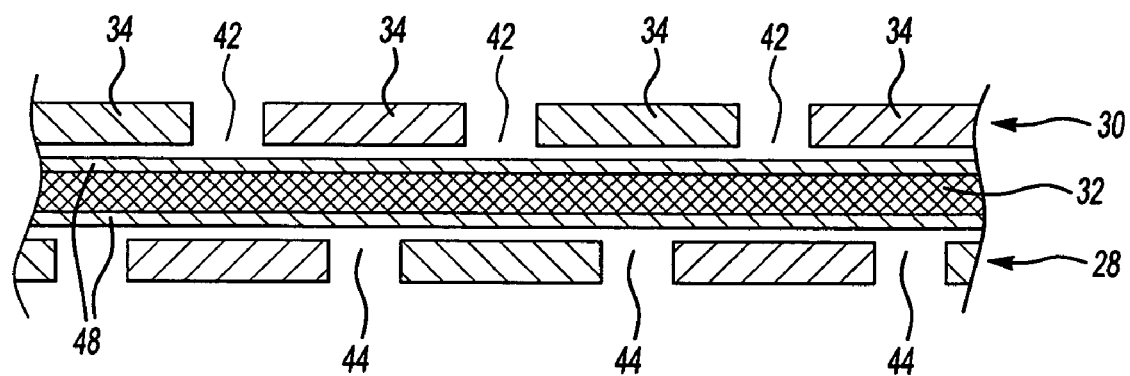
FIG. 5 is a cross-sectional view of the example seal assembly.
Figure 6:
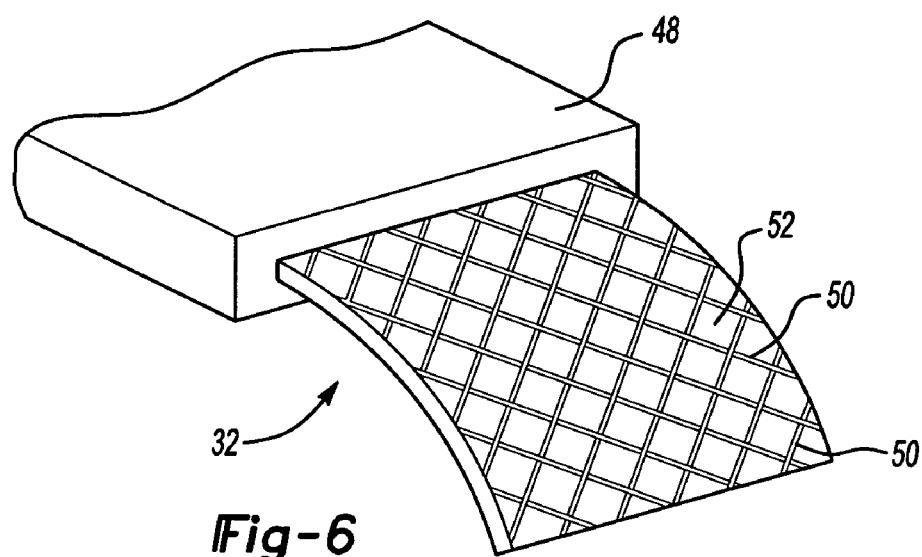
FIG. 6 is a perspective view of an example mesh member according to this invention.

Referring to FIGS. 5 and 6, the inner plate 30 includes the slots 42 and the outer plate 28 includes slots 44. The slots 42, 44 are staggered from each other to prevent leakage of combustion gases. Although the slots 42, 44 are spaced apart the end portion of the seal remains flexible as is desired to facilitate movement between the fixed and movable parts 22, 24 of the exhaust duct assembly 18. The metal mesh member 32 disposed between the inner plate 30 and the outer plate 28 blocks intrusion of combustion gases out of the exhaust duct assembly 18.

The metal mesh member 32 is composed of a plurality of interwoven wire strands 50. The wire strands 50 are preferably comprised of a material having properties that are compatible with the temperatures common to the exhaust duct assembly environment. The interwoven wire strands 50 are weaved within each other to provide a porosity created by the plurality of open spaces 52 between the wire strands 50 of between 5 and 20 microns, or preferably between 5 and 10 microns. In the example embodiment the porosity is 8 microns. The substantially small porosity provides the desired low leakage through the metal mesh member 32. Further, the small porosity provides of the encapsulation or coating of the metal mesh member 32 with a high temperature elastomeric sealant to further prevent the flow of combustion gases through the seal 26 while maintaining the desired flexibility.

The example metal mesh member 32 provides a stable substrate for impregnation with a high temperature elastomeric sealant 48. The high temperature elastomeric sealant 48 is preferably a room temperature vulcanized silicon. However, any high temperature elastomeric sealant-that remains flexible as desired and is compatible with the temperatures that the exhaust duct assembly 18 is exposed to are within the contemplation of this invention. The impregnation of high temperature elastomeric sealant 48 over the metal mesh member 32 improves sealing while maintaining the desired flexibility of the seal 26.

The high temperature elastomeric sealant 48 impregnated metal mesh member 32 provides improved sealing while maintaining the desired flexibility of the seal 26 thereby improving engine performance and efficiency.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A seal assembly comprising:
a first sheet including a first plurality of slots;
a second sheet including a second plurality of slots; and
a flexible metal member disposed between said first sheet and said second sheet, said flexible metal member including a plurality of intermeshing metal strands disposed within a high temperature elastomeric sealant, wherein said flexible member includes a welded joint to at least one of the first sheet and said second sheet.

2. The assembly as recited in claim 1 wherein said second plurality of slots are staggered relative to said first plurality of slots.

3. The assembly as recited in claim 1, wherein said first plurality of slots define a corresponding first plurality of flexible portions, and said second plurality of slots define a corresponding second plurality of flexible portions.

4. The assembly as recited in claim 1, wherein said flexible metal member is attached to one of said first sheet and said second sheet.

5. The assembly as recited in claim 1, wherein said flexible metal member extends longitudinally through said slots within said first and said second plurality of slots.

6. The assembly as recited in claim 1 wherein said flexible metal member comprises a porosity between 20 and 5.

7. The assembly as recited in claim 1 wherein said flexible metal member comprises a porosity between 10 and 5.

8. The assembly as recited in claim 1, wherein said welded joint comprises a plurality of welded joints spaced apart from each other and disposed longitudinally across the seal assembly.

9. An exhaust duct assembly comprising:
a fixed member;
a movable member;
a seal fixed to one of said fixed member and said movable member, said seal including an outer layer having a first plurality of slots, an inner layer having a second plurality of slots, and a metal mesh member impregnated with a high temperature elastomeric sealant disposed between said outer layer and said inner layer, wherein sad metal mesh member includes a welded joint to at least one of the inner layer and the outer layer.

10. The assembly as recited in claim 9 wherein said metal mesh member comprises a plurality of intermeshed metal strands.

11. The assembly as recited in claim 9 wherein said high temperature elastomeric sealant is capable of withstanding temperatures of an exhaust combustion gas.

12. The assembly as recited in claim 9 wherein said first plurality of slots define a corresponding first plurality of flexible portions of said outer layer, and said second plurality of slots define a corresponding second plurality of flexible portions of said inner layer.

13. The assembly as recited in claim 10 wherein said first plurality of slots are offset relative to said second plurality of slots in a radial direction.

14. The assembly as recited in claim 9, wherein said welded joint comprises a plurality of welded joints spaced apart from each other and disposed longitudinally across the said seal.

* * * * *

UNITED STATES PATENT AND TRADEMARK OFFICE
CERTIFICATE OF CORRECTION

| | |
|---|---|
| PATENT NO. | : 7,367,567 B2 |
| APPLICATION NO. | : 11/070453 |
| DATED | : May 6, 2008 |
| INVENTOR(S) | : Farah et al. |

It is certified that error appears in the above-identified patent and that said Letters Patent is hereby corrected as shown below:

Claim 9, Column 4, line 42: "sad" should read as --said--

Signed and Sealed this

Nineteenth Day of August, 2008

JON W. DUDAS
*Director of the United States Patent and Trademark Office*